(12) United States Patent
Bader (10) Patent No.: US 11,625,674 B2
(45) Date of Patent: Apr. 11, 2023

(54) PROCESS FOR DELIVERING AN ORDER TO A SEMIAUTONOMOUS MOTOR VEHICLE

(71) Applicant: Volkswagen Aktiengesellschaft, Wolfsburg (DE)

(72) Inventor: Viktor Bader, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 337 days.

(21) Appl. No.: 16/927,806

(22) Filed: Jul. 13, 2020

(65) Prior Publication Data

US 2021/0049551 A1 Feb. 18, 2021

(30) Foreign Application Priority Data

Jul. 16, 2019 (EP) .................................. 19186582

(51) Int. Cl.
*G06Q 10/08* (2023.01)
*G08G 1/01* (2006.01)
(Continued)

(52) U.S. Cl.
CPC . *G06Q 10/08355* (2013.01); *B60W 60/00256* (2020.02); *G01C 21/3438* (2013.01);
(Continued)

(58) Field of Classification Search
CPC .......... G06Q 10/08355; G06Q 10/083; B60W 60/00256; B60W 2554/406; G01C 21/3438; G05D 1/0212; G08G 1/0133
See application file for complete search history.

(56) References Cited

U.S. PATENT DOCUMENTS

2017/0089720 A1 3/2017 Zhang et al.
2018/0012224 A1* 1/2018 Ricci .................... G06Q 20/105
(Continued)

FOREIGN PATENT DOCUMENTS

CN 107036616 A 8/2017

OTHER PUBLICATIONS

Demuro, Rich; "GM's New Infotainment System Lets You Order Food From Your Dashboard" https://ktla.com/morning-news/technology/gms-new-infotainment-system-lets-you-order-food-from-your-dashboard/ Jul. 6, 2018.*
(Continued)

*Primary Examiner* — Brian P Sweeney
(74) *Attorney, Agent, or Firm* — Loza & Loza, LLP; Peter Zura (57) ABSTRACT

Technologies and techniques for delivering an order to an at least semiautonomous motor vehicle, and a motor vehicle. If an ordering function is activated, provider information is obtained from potential providers that offer delivery of an order by means of a mobile delivery system within a predefined area on a determined route from a current position of the motor vehicle to a destination. Coordinates and a time for a meeting of the motor vehicle with the mobile delivery system are determined for each of the potential providers that have been determined using traffic condition and planning criteria, and a corresponding ordering option that can be activated is provided. As soon as the ordering option is activated, the motor vehicle is at least semiautonomously driven to the determined meeting.

21 Claims, 1 Drawing Sheet

(51) Int. Cl.
  *G01C 21/34*   (2006.01)
  *G05D 1/02*    (2020.01)
  *B60W 60/00*   (2020.01)
  *G06Q 10/0835* (2023.01)

(52) U.S. Cl.
  CPC ......... *G05D 1/0212* (2013.01); *G08G 1/0133* (2013.01); *B60W 2554/406* (2020.02)

(56) References Cited

U.S. PATENT DOCUMENTS

2018/0356823 A1* 12/2018 Cooper ................ B64C 39/024
2020/0026291 A1*  1/2020 Kim ................... G01C 21/3438

OTHER PUBLICATIONS

EP Appln. No. 19186582.3. Search Report (dated Nov. 4, 2019).

\* cited by examiner

PROCESS FOR DELIVERING AN ORDER TO A SEMIAUTONOMOUS MOTOR VEHICLE

RELATED APPLICATIONS

The present application claims priority to European patent app. no. EP19186582.3 to Viktor Bader, filed Jul. 16, 2019, the contents being incorporated by reference in their entirety herein.

BACKGROUND

The invention relates to a process for delivering an order to an at least semiautonomous motor vehicle, and a motor vehicle with a control unit that is configured to execute corresponding parts of a process in such a process.

Many people carry an intelligent device with them these days, a so-called smart device, for example, a smartphone. Various additional functions already exist for such devices, for example, ordering applications for ordering goods and/or services, or navigation functions. If the person is in a motor vehicle, for example, at the time, it may contribute to the convenience if an ordering process with a service provider, for example, a delivery service for food, is carried out from the motor vehicle.

US 2017/0089720 A1 discloses a process for a motor vehicle in which navigation information is first evaluated and it is determined which service provider offers are available along the route taken by the motor vehicle. As a result, an occupant in the motor vehicle is able to make a reservation at a restaurant on the route and/or directly contact a service provider.

CN 107036616 A discloses a navigation-based ordering system in which an occupant can specify a desired delivery target for where an order is to be delivered, for example, a meal order.

The object of the invention is to provide a solution by means of which an order for an occupant of a motor vehicle can be conveniently delivered.

BRIEF DESCRIPTION OF THE DRAWINGS

Examples of the invention shall be explained below in reference to the drawing. Therein.

DETAILED DESCRIPTION

Aspects of the present disclosure are designed to deliver an order to an at least semiautonomous motor vehicle. It may be regarded as particularly convenient for an occupant of the vehicle if the order is delivered to the occupant directly in the motor vehicle. The order can be, for example, a food order, for example, a pizza, a fast-food meal, or some other dish. Alternatively or additionally, the order can be a package or a letter, wherein a prerequisite for this is that the delivery of the order to the motor vehicle is within reason with regard to the size and/or weight of the object. The motor vehicle is preferably fully autonomous, but can also be semiautonomous, controlled using a driver assistance system, wherein a target destination has been entered and the navigation system for the driver assistance system, for example, a navigation system in the motor vehicle, is activated at that time.

Processes for delivering an order to the at least semiautonomous motor vehicle may include the following steps: first, it is checked whether an ordering function is activated in the motor vehicle. A symbol can be displayed for this purpose, for example, on a touchscreen in the motor vehicle, which then can be actuated to activate the ordering function. The ordering function may also be activated by means of a corresponding application on a mobile end device, for example, a smartphone carried by an occupant in the motor vehicle, for example, if the mobile end device is coupled with the motor vehicle, for example, via a Bluetooth connection. The ordering function can then be activated by the occupant of the motor vehicle. The activated ordering function can therefore indicate that he wants to have food delivered to the at least semiautonomous motor vehicle. The activation of the ordering function can also indicate that the occupant wants some other arbitrary order to be delivered.

In some example, a current position and destination of the motor vehicle may be determined in a further step. At least one route from the current position of the motor vehicle to the destination may be subsequently determined, taking route optimization criteria into account. These criteria contain guidelines regarding route planning for the motor vehicle, and can be set, for example, through inputs from the occupant of the vehicle. In this manner, it can be determined, for example, which type of street is preferably driven on when selecting the route. A current traffic situation between the current position and the destination may also be taken into account by the route optimization criteria when determining a route. In some examples, more than one possible route may be determined, wherein the individual routes differ with regard to, for example, the overall driving distance, overall driving time, and/or overall fuel consumption by the motor vehicle for each route. Various possibilities that are regarded as optimal may be therefore first determined, taking the route optimization criteria into account, each of which leads from the current position to the target destination. The current position can be any arbitrary location on a road, and the destination for the motor vehicle can be the occupant's address, for example.

If the ordering function has been activated, provider data are obtained from potential providers in a further step. These providers are respective providers that offer delivery of an order by means of a mobile delivery system within a predefined area along the at least one determined route. If the occupant indicates, for example, using the activated ordering function, that he wants to place a food order, various potential delivery services for restaurants that are designated to deliver food within a respective predefined area along one of the respective routes for the motor vehicle are displayed. The respective delivery system can be a delivery service using a courier, in particular using a semi-autonomous or fully autonomous vehicle, a bicycle courier, or an autonomous delivery drone. The provider information contains, for example, the name of the potential provider, information regarding its menu selection, i.e. available food and/or beverages, customer ratings from people who have used this provider previously, information regarding additives in the meals that are offered, and/or additional information regarding a restaurant as a potential provider for take-out orders. This provider information is only supplied by the providers that offer delivery within a maximum distance to the respective determined routes, such that potential providers that do not offer delivery along the route from the current position to the target destination, and are therefore irrelevant, are not listed. The corresponding maximum distance, i.e. the predefined area, can be determined by the provider, or it can be set for all potential providers, using a general standard value for the maximum distance.

For each potential provider from which the respective provider information is obtained, coordinates and a point in time at which the motor vehicle will meet with the mobile delivery system are then determined for delivery of the order. This determination takes place using traffic condition criteria describing current traffic conditions, and planning criteria. The planning criteria comprise, for example, coordinates for the respective potential provider, i.e. a point of origin and/or availability of the order. In addition, preparation times for the order, capacity of the mobile delivery system, and other data relating to the planning for delivery of the order, are also provided. The traffic criteria contain information, for example, regarding the traffic flow between the current position of the motor vehicle and a potential meeting point with the mobile delivery system, as well as between the point of origin and/or availability of the order and the potential meeting point. Information regarding congestion, construction sites, or speed limits along a route from the respective starting location to the potential meeting point can also be taken into account. It is therefore possible to determine a meeting point with regard to the time and location where the order can be delivered and thus obtained from the mobile delivery system, such as the bicycle courier, by the motor vehicle, and thus the occupant of the motor vehicle, using the traffic criteria and planning criteria. The coordinates for the meeting are determined as the location, and the time of the meeting is determined as the time. The determined coordinates for the meeting point may be the coordinates for a rest area, a parking lot, a parking space, or some other location where it is possible to deliver the order without impeding other road users. The time depends on the delivery time the potential provider needs for the order, and a distance to the meeting point from the current position of the motor vehicle, and the point of origin and/or availability for the potential provider.

The obtained provider information, as well as the determined coordinates and the determined time for the meeting, are then displayed on a display panel in the motor vehicle. It is also possible to distinguish which order from the potential provider can be delivered at what time to the determined location for the meeting from the provider information. Furthermore, there can also be an ordering option that can be activated for placing the order with the potential provider. By way of example, in addition to displaying the information regarding the delivery of the order on the touchscreen in the motor vehicle, or on the mobile end device coupled to the motor vehicle, there can also be an actuation function with which the order can be placed, such that the delivery of the order to the determined coordinates and at the determined time for the meeting can be confirmed.

If the ordering option for placing an order with a potential provider is then activated, i.e. a delivery service and the dish that is desired have been selected, the motor vehicle is at least semiautonomously driven to the determined meeting with the mobile delivery system. The motor vehicle is therefore driven to the determined, and potentially confirmed by means of the confirmation function, meeting with the mobile delivery system, such that it drives to the determined coordinates and arrives there at the anticipated time for the meeting. The order can then be obtained at the location for the determined meeting at the determined time, the coordinates and time for which have been dynamically determined taking the traffic and planning criteria into account. If the occupant of the motor vehicle decides to order a pizza from a pizzeria, for example, that offers delivery within the predefined area along the determined route, the motor vehicle takes the occupant of the motor vehicle to the determined meeting using the process, such that the occupant of the motor vehicle can receive the pizza from the mobile delivery system, i.e. a pizza delivery courier, for example. By this means, the optimal meeting point for delivery of the order to the motor vehicle is automatically determined without any input from the occupant or the delivery service. Consequently, an advantageous meeting point for both parties can be determined and agreed on, based on the traffic conditions, as well as the current planning state of the provider, i.e. the capacity of the pizzeria. As a result, it is not necessary to make a detour to get to the pizzeria itself, nor does the occupant of the motor vehicle have to be concerned with any planning to obtain the order, because the motor vehicle is automatically driven by its at least semiautonomous driver assistance system to the determined meeting.

The individual steps described above are preferably executed by a control unit in the motor vehicle, which can exchange information with an external processor, for example, an external server for coordinating orders placed with a potential provider. The communication between the control unit and this external processor takes place, for example, via a respective wireless communication connection, for example, a Car-to-X communication, or a mobile data network.

Embodiments that result in additional advantages are also contemplated in the present disclosure.

In some examples, if the ordering option is activated, ordering data describing the placement of a delivery order, as well as the determined coordinates and the determined time for the meeting of the motor vehicle with the mobile delivery system are transmitted to an external processor. The external processor then uses delivery planning criteria to determine a delivery route to the meeting point, and a delivery time for the mobile delivery system. The determined delivery route and the determined delivery time are then sent to the mobile delivery system. Therefore, not only is the route from the current location of the motor vehicle to the coordinates determined for the meeting point provided for the motor vehicle, but also a corresponding route planning is provided for the potential provider.

The external processor is preferably involved in planning the delivery route for the delivery system. The external processor can be in the form of a server, for example, but it can also be a mobile end device, for example, a smartphone carried by a bicycle courier, a computer operated by the potential provider, or a server for an ordering service provider.

The traffic criteria describing the current traffic conditions can be drawn on to determine the delivery route as well as the delivery time. It can also be taken into account in in the delivery planning criteria for planning the delivery route, that deliveries may be made to different customers by the mobile delivery system, for example, the delivery system may have to go to various different coordinates for respective food deliveries in the case of a food delivery service. Furthermore, the precise time for the mobile delivery system to leave with the order can be dynamically adjusted depending on the determined delivery route or delivery time, and optimized for the potential provider with regard to costs and the sequence of deliveries. This may ensure that the order will actually be delivered to the motor vehicle at the determined meeting point by the mobile delivery system.

In some examples, if provider information is obtained from numerous potential providers, a respective ordering probability may be determined with ordering behavior criteria based on the obtained provider information. This ordering probability estimates the probability that an occupant of the motor vehicle will place an order with the respective potential provider of the order. The determined ordering probability is then evaluated to provide the respective ordering option for the order.

The offer of the ordering option can be personalized with the ordering behavior criteria in that, for example, information regarding a typical ordering behavior of the occupant can be taken into account. If it is known, for example, that the occupant prefers Italian food, and in this context, normally orders a pizza margherita, this typical choice can be stored with the ordering behavior criteria. There is therefore a high probability of ordering a pizza margherita, whereas the probability of ordering a pasta dish would be lower. Food orders of other types, for example, from a fast-food menu, would accordingly have a lower probability than the pasta dish, because they do not reflect the preference of the occupant for Italian food. The ordering option for pizza margherita at the pizzeria, or numerous pizzerias, is then highlighted on the display panel, and shown, for example, as the first individual ordering option, or as successive numerous ordering options from a list of ordering options. Other ordering options from other providers or other dishes are listed below in order of decreasing probability. As a result, it is easy and convenient to place an order from the motor vehicle that would most probably be ordered by the occupant. Such a prioritizing of selected ordering options using the ordering behavior criteria can be set by the occupant personally, such that intentionally selected preferences can be stored in the motor vehicle. It is also possible to prioritize specific orders on the display screen, based on the frequency with which they are placed, potentially with a specific potential provider, in the list of provider information obtained in the framework of ordering options.

It is also possible to display a history of previous orders, for example, the last five orders, placed from the motor vehicle. As a result, ordering behavior criteria is likewise used and an ordering probability is determined, in that by listing recent orders, it may be possible to determine one item has a higher probability than another of being ordered.

According to some examples, it is provided that the ordering behavior criteria comprises at least one of the following guidelines: a maximum time limit for delivery of the order, a maximum price for the order, a maximum delay for arrival at the destination through driving to the determined coordinates for the meeting, a minimum average customer rating for the potential provider, and/or stored ordering behavior data for the occupant. Corresponding adjustments can be made by the occupant in advance, for example, to provide the occupant with an ideal means of ordering using the process described herein. By way of example, the occupant may desire the quickest possible delivery, such that the maximum time required for the meeting is of relevance, and is therefore specified. The occupant can specify, for example, that all deliveries must take place within 20 minutes after placing the order, such that potential providers that have longer delivery times are not displayed, or only displayed with lower priority as an option for placing an order. A price range can also be specified for the desired order. A potential maximum detour from the current route may also be relevant to the occupant, due to how long the occupant is willing to spend time in the motor vehicle to reach the determined meeting point and then return to the current route, thus delaying arrival at the ultimate destination. The occupant can also determine whether a minimum positive rating from others who have already made purchases from the potential provider, for example, in an online rating portal for delivery services, should be used as a criterion for whether the potential provider should be displayed. It is possible to store preferences for food and/or beverages using the stored ordering behavior data for the occupant. Food allergies, dishes that are not liked, and favorite foods and beverages can also be specified. The ordering probability can be particularly easily determined based on the specified individual guidelines, such that a list sequence for the possible orders can be tailored to the occupant. Consequently, the selection of both the order and the provider is made user friendly, such that orders can be easily placed with greater probability of selecting the optimal order and/or by identifying a desired order with greater probability, such that it can be subsequently placed.

In some examples, an ordering probability for an occupant of the motor vehicle is determined using ordering preference criteria. If the determined ordering probability is greater than a predefined minimum limit probability, the ordering function can be activated in the vehicle. It is checked at the start of the process whether the ordering function has been activated in the motor vehicle, which can take place, as described above, through a manual activation of the ordering function by the occupant of the motor vehicle. It is also possible for the motor vehicle itself, for example, with a control unit in the motor vehicle, to dynamically and automatically first calculate whether the ordering probability is sufficient for automatically activating the ordering function.

The probability and associated data may be stored in the motor vehicle, using the ordering preference criteria, for example, that the occupant of the motor vehicle normally eats lunch between 12:00 and 1:00 PM, and likes to have lunch delivered to the motor vehicle at this time, if the occupant is driving a longer distance at lunchtime, for example, to a business meeting. With such an occupant, an increased ordering probability is assumed starting at 11:30, in that starting at 11:30 AM, the minimum limit probability has been reached, such that it is suggested to the occupant of the motor vehicle by means of a corresponding display on the display panel in the motor vehicle that a food delivery service be selected where lunch can be ordered that is able to deliver the order to the motor vehicle between 12:00 and 1:00 PM. As a result, an occupant of the motor vehicle who might forget to eat lunch, due to stress, for example, can be reminded that it is close to their normal lunch time, thus providing a convenience tailored to the specific desires of the occupant. An automatic determination of the ordering probability, for example, for the delivery of medications that may be needed at a specific time, may be relevant to the occupant of the motor vehicle. A coupling of the ordering preference criteria to the guidelines stored by the occupant regarding orders that are currently or will soon be needed, for example, food, household goods, or book shipments, may also be useful. Accordingly, it is therefore possible to automatically offer an ordering function tailored to the occupant, thus increasing the convenience for the occupant of the motor vehicle when placing an order for delivery.

In some examples, the ordering behavior criteria, the ordering behavior data, and/or the ordering preference criteria are stored in an occupant profile linked to the occupant of the motor vehicle. This occupant profile is configured to provide the ordering option and/or ordering function. If the ordering behavior criteria are stored, for example, in the occupant profile linked to the occupant of the vehicle, they can be evaluated and drawn on when determining the respective ordering probability for the respective potential providers, and therefor for providing the ordering options. The ordering behavior data in the form of data stored in the occupant profile are used for specifying the ordering behavior criteria for the respective occupant. If the occupant profile contains, in general or additionally, ordering preference criteria, they can also be evaluated and drawn on for the ordering function in the motor vehicle.

The occupant profile can be stored in the motor vehicle, for example, in a memory in the motor vehicle, and/or in the external processor, wherein, if it is stored in the external processor, there is a corresponding data exchange between the motor vehicle and this external processor for transferring the information stored in the occupant profile. The data exchange takes place, for example, via a Car-to-X communication, or some other type of wireless communication connection. The occupant profile can be activated for this by the occupant of the motor vehicle currently using the motor vehicle. It is also possible to identify the occupant of the vehicle with a sensor system, by means of which an occupant in the driver's seat of the motor vehicle is identified by a camera in the vehicle interior and an evaluation device in the motor vehicle that is configured to execute object identification procedures, and consequently the occupant profile for the occupant identified in the driver's seat can be called up and/or uploaded. It is also possible to identify another occupant in the motor vehicle not sitting in the driver's seat. This would be the case, for example, if it is detected by the camera and the evaluation device that a passenger has actuated the corresponding actions, for example, the activation of the ordering function, on the display panel in the motor vehicle, such that the passenger is identified as the relative occupant for the ordering procedure. If it is determined, for example, that the occupant of the motor vehicle who activated the ordering function, or selected the ordering option, ordered pizza margherita the last time, this will affect both the ordering options that are displayed and potentially the point in time at which the ordering function is automatically provided.

The order can also be placed independently of the preferred ordering options that are presented, such that it is possible to change a beverage or food selection at any time independently of the ordering behavior for the occupant stored in the occupant profile, for example.

The linking to the occupant profile makes it possible in some examples to not store the relevant data relating to placing the order in the motor vehicle itself, such that these data can be accessed at any time by the motor vehicle in an occupant profile stored for example in an external central server. This reduces the amount of data stored in the motor vehicle and also facilitates any updating of the occupant profile, because it can not only store orders placed from the motor vehicle in a history, but also links the occupant profile to other orders, for example, food deliveries, such that it can be tailored to the individual particularly effectively. This increases the convenience for the occupants of the motor vehicle.

In some examples, the ordering function may be activated in the motor vehicle if it has been determined that a predefined driving action is to be executed by the motor vehicle. It may be the case, for example, that every time the motor vehicle exits a highway, it can be assumed that the occupant of the vehicle may want a food delivery. As soon as the motor vehicle determines that it has exited the highway in the framework of the route to the target destination, the ordering function is displayed, such that the occupant can decide whether or not to place an order for food to be delivered to the motor vehicle. Specifically, it may be the case that whenever the driver of the vehicle decides to leave the current route, for example, on a highway, via an exit, this driving action, i.e. leaving the highway at an exit, thus detouring from the route proposed by the navigation system, is linked to a desire to eat on the part of the occupant. At this point, a new intermediate destination is automatically generated without having to be queried, which is a meeting, i.e. the coordinates for a meeting with a mobile delivery system for a restaurant, because this driving action is stored in the system, linked to a desire for food. At this point, the navigation system will not attempt to steer the driver back to the highway, but instead first check whether there is a potential provider in the area, and then display the corresponding provider information, and the determined coordinates and a time determined for the meeting, in the motor vehicle, and provide the corresponding ordering function. The area can be defined in this case to be within a 30 km radius or 15 minutes driving time from the exit ramp on the highway, such that any detours associated with leaving the highway can ultimately be kept as short as possible.

A variety of predefined driving actions can be stored in general in this context. There can also be a permanent location link, for example, such that when the distance to the destination is 50 km, for example, the ordering function is displayed to the occupant as an ordering function that can be activated in the motor vehicle. The driving action that is predefined in this case can preferably be defined by the occupant of the motor vehicle, for example, using the occupant profile or a corresponding adjustment in the motor vehicle. The ordering probability itself is not determined for this, and instead, the ordering function is provided in the motor vehicle, or even automatically activated, depending only on the observed driving action. This is particularly convenient for an occupant of the motor vehicle who exhibits behavior routines and habits that are linked, for example, to a location, driving maneuver, or a distance to the destination, which can therefore be readily evaluated and taken into account when placing an order for delivery.

In some examples, a query signal may be transmitted to the at least one potential provider for which provider information has been obtained. This query signal asks whether the order can be delivered to the specified coordinates and at the specified time by the at least one potential provider. The ordering option for the provider is only provided if a response signal is received, by means of which the query is confirmed. If it is not possible to deliver the order to the specified location at the specified time, for example, because the kitchen where the order must first be prepared is too busy, or because the mobile delivery system is too busy, this is determined prior to placing the order and taken into account accordingly. It may be the case that the responding potential provider is unable to deliver the order to the specified coordinates at the specified time, at which point, if the order is still desired from the corresponding provider, an additional detour or additional waiting time on the part of the motor vehicle may be accepted at the discretion of the occupant of the motor vehicle. The specification of the coordinates and time for the meeting therefore takes into account not only the corresponding prerequisites for the motor vehicle, but also for those for the potential provider or the mobile transfer device. This ensures that only those ordering options can be activated that can actually be implemented, and thus exist, such that it is not possible to place an order that cannot be delivered to the coordinates and at the time specified by the motor vehicle, for example. As a result, a delivery order can be placed particularly reliably.

In some examples, the provider information may include current order time data. The order time data are continuously generated using the traffic condition criteria describing the current traffic conditions and the planning criteria. The current order time data may be refreshed, for example, at respective predefined time intervals, for example, every minute. These order time data indicate the latest point in time at which the ordering option can be activated for placing an order to be delivered to the specified coordinates at the specified time for the meeting. Ultimately, this also tells the occupant how much time there is for placing a binding order, so that the order can be placed early enough to be able to reach the specified meeting place at the specified time.

The respective latest time may be dependent on a selected dish, i.e. the effort required, for example, for preparing the selected dish. For each potential provider, i.e. for every delivery service, the occupant is shown dynamically the time at which the binding order must be placed in order to reach the specified meeting for the transfer in time. Depending on the current traffic conditions, and the current number of orders to the potential provider, for example, these order time data may vary. If there is suddenly a traffic jam, for example, between the restaurant for the potential provider and the specified coordinates for the meeting, the latest point in time may be moved forward, for example. By way of example, it may be necessary to place an order earlier with the potential provider, due to traffic conditions, to reach the specified meeting in time, as opposed to in peaceful, relaxed traffic conditions. During the display of the obtained provider information, the specified coordinates, and the specified time for the meeting, the latest possible point in time determined for placing the order, and thus the current order time data, is also shown. This information can be shown, for example, with the ordering option that can be activated. As a result, the occupant can already assess how quickly and when a binding order must be placed when selecting an item, and can consequently make a decision without additional stress. This contributes to the convenience for the occupant, because he will not feel forced into placing an order, and can avoid making a hasty decision regarding the order. A potential for stress caused by pressure to make a decision based on an assumed, but not actually existing, lack of time for making the decision, is consequently reduced when using the process.

In some examples, the delivery of the order to the specified coordinates may be checked at a specified time for the meeting can still be achieved after the ordering option has been activated using realization criteria. It may be continuously checked, e.g., in predefined time intervals, for example, of typically a minute, whether the initially specified coordinates and the specified time for the meeting of the motor vehicle with the mobile delivery system can still be met, both on the part of the motor vehicle and on the part of the mobile delivery system and the potential provider. The realization criteria comprise, for example, information regarding current traffic conditions, such as the traffic condition and planning criteria. By way of example, the delivery route and the delivery time for the mobile delivery system, the current capacity of the kitchen for the potential provider of the food, and or the current driving behavior of the driver of the motor vehicle, if the driver is determining the speed of the motor vehicle, are therefore taken into account in the framework of the realization criteria. If it is then determined that the order cannot be delivered to the specified coordinates at the specified time for the meeting, alternative coordinates and/or an alternative time for an alternative meeting are determined using the traffic condition and planning criteria. The motor vehicle is then at least semi-autonomously driven to the alternative meeting.

If it has been determined, for example, that a delivery cannot be made at a desired time to a parking lot along the driving route, because the desired order is delayed, an alternative location can be determined, for example, three kilometers further along the route, but closer to the restaurant for the potential provider, and the driving route for the motor vehicle as well as delivery route for the mobile delivery system are automatically updated and adjusted. The transfer location and the transfer time for the food delivery is therefore re-generated and potentially dynamically adjusted. Current traffic conditions are particularly decisive with such a dynamic adjustment using the realization criteria, in particular when this results in a delay in reaching the coordinates specified for the meeting. Other criteria may also be relevant, such as the capacity of the provider's kitchen, the capacity of the mobile delivery system, or other events relating to the mobile delivery system, for example, a flat tire, such that an alternative delivery system has to assume delivery of the order. By planning an alternative meeting, the actual meeting of the motor vehicle with the delivery system can be realized with a high probability, because any delays or other impediments regarding the initially specified meeting can always be avoided with a high probability by generating an alternative meeting for delivering the order to the motor vehicle. The occupant is therefore no longer actively involved with the actual delivery of the order after placing the order, and can assume that the meeting is automatically planned, taking all of the possible circumstances into account, and that through corresponding control commands to the motor vehicle and the mobile end device, it is highly probable that the order will be actually delivered. The reliability of the delivery of the order is therefore very high. It is particularly higher than with conventional processes, in which only the specified location and the specified time for the meeting are taken into account when the order is placed, without any dynamic adjustments, for example, due to changing traffic conditions.

In some examples, as soon as the ordering option is activated, a binding order for the delivery is placed with the corresponding provider, for example, a binding delivery is demanded by means of the mobile delivery system to the specified coordinates and at the specified time. There are no further queries, therefore, regarding whether the occupant actually wants to place the binding order, and instead, the activation of the ordering option per se is regarded as the placing of the order. As a result, placing an order is simple and uncomplicated.

Alternatively, in another example, as soon as the ordering option is activated, an order confirmation option that can be activated is displayed in the motor vehicle. A binding delivery order is first placed with the corresponding provider after activating the order confirmation option. There are therefore no additional queries or requests from the potential provider, for example, to the occupant of the motor vehicle regarding whether the binding order is actually intended. It may be the case in particular, that the order time data is first displayed to indicate to the occupant how much time is left to actually place the binding order with the provider by activating the ordering option. This shows in a particularly intuitive manner that, although the ordering option has already been selected and specified, the occupant can still wait before placing the binding order, in case he spontaneously wants to change or cancel his order with the selected provider. Together with the dynamic display of the time before the latest possible time for placing the order, this provides an additional check with which it can be ensured that the occupant actually wants delivery of the order by means of the mobile delivery system, or that this desire will be maintained from the perspective of the occupant.

The motor vehicle according to the present disclosure comprises a control unit. This control unit is configured to execute the steps of the process described above for delivering an order to an at least semiautonomous motor vehicle. The motor vehicle therefore comprises a communication interface, for example, configured for Car-to-X communication, or communication via a mobile data network. A communication connection to an external processor is established with this communication interface, via which corresponding provider information can be received, and the data describing the current traffic conditions are transmitted for use with the traffic condition criteria. Furthermore, the ordering option that has been activated can also be sent to the corresponding provider by means of the communication interface and the communication connection, such that the order is actually placed. The examples presented herein in conjunction with the process according to the present disclosure and their advantages apply accordingly, where applicable, to the motor vehicle according to the present disclosure. For this reason, the corresponding developments of the motor vehicle according to the present disclosure shall not be described again.

The present disclosure also provides the control unit for the motor vehicle. The control unit has a processor that is configured to execute an embodiment of the process, i.e. the steps of the process according to the present disclosure that take place in the motor vehicle. The processor can contain, for example, a microprocessor and/or at least one microcontroller for this. The processor can also contain program code configured to execute the embodiment of the process according to the present disclosure when it is executed by the processor, i.e. the steps that take place in the motor vehicle. The program code can be stored in a data memory in the processor.

The present disclosure also contemplates combinations of the features of the embodiments described herein.

An exemplary embodiment of the present disclosure is described below.

Figure 1:
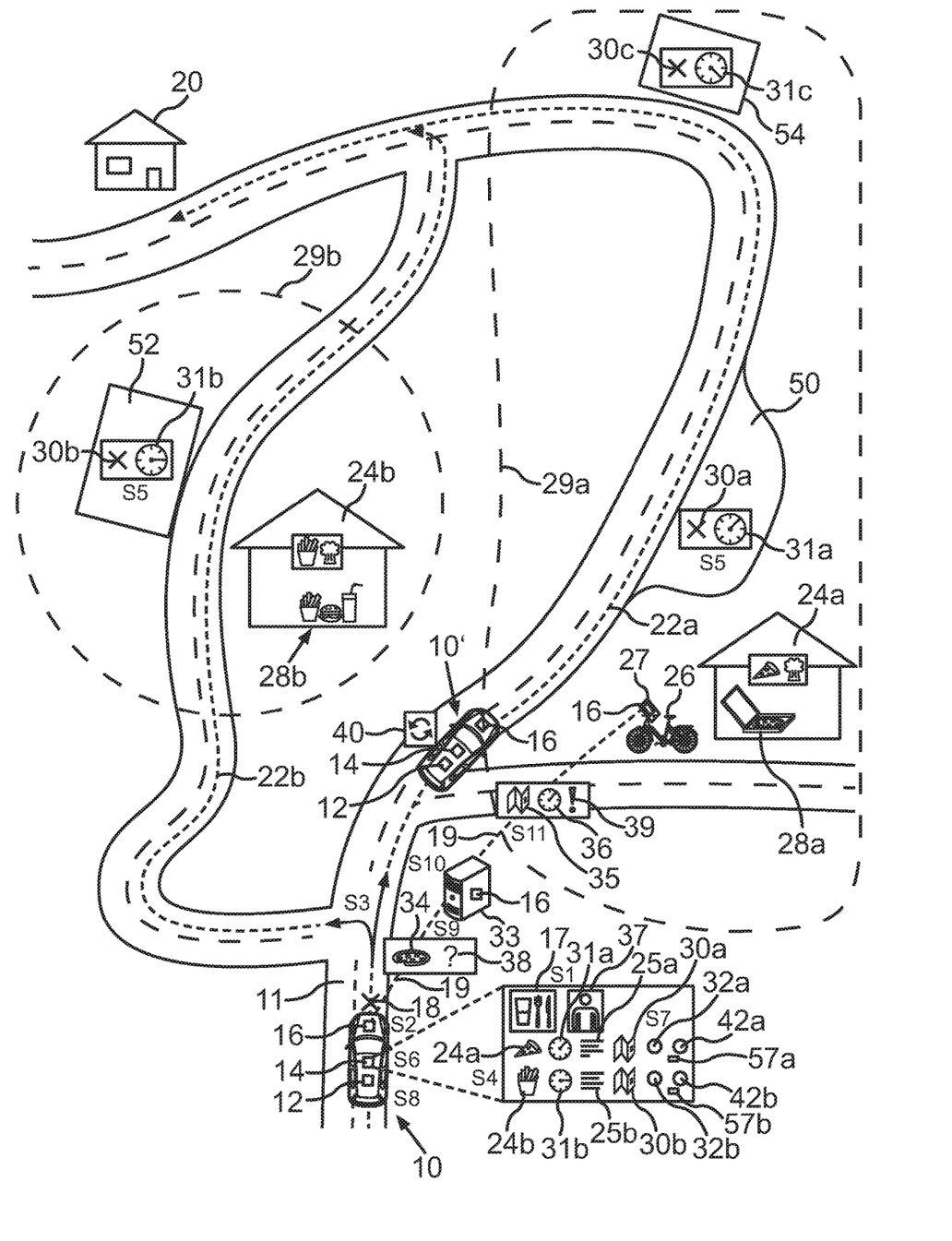
FIG. 1 shows a yaw moment regulation in a motor vehicle, in a schematic illustration.

FIG. 1 shows a schematic illustration of a motor vehicle, the occupant of which places a delivery order with a mobile delivery system under some examples.

In the exemplary embodiment, the components of the embodiment each represent individual features of the present disclosure that are to be regarded independently, which can each be further developed independently in the framework of the present disclosure, and are therefore also to be regarded individually or in combinations other than those shown as a component of the present disclosure. Furthermore, the embodiment described herein can also be supplemented with other features of the present disclosure described above.

Elements having the same function are provided with the same reference symbols in the Figure.

A motor vehicle 10 is illustrated in FIG. 1, which travels at least semiautonomously on a street 11. The motor vehicle 10 shown here is actually driven fully autonomously on the street 11, and comprises a control unit 12, a display panel 14, and a communication interface 16. The control unit 12 is configured to engage in the longitudinal guidance and the transverse guidance of the motor vehicle 10, among other things, i.e. to at least semiautonomously control the motor vehicle 10. The communication interface 16 is configured to establish a communication connection 19 to an external processor 33. This communication connection 19 can be in the form of a Car-to-X communication or communication via a mobile data network or mobile telephone network. The motor vehicle 10 is at the current position 18, indicated in the FIGURE with an X. The display panel 14 is a touchscreen in the motor vehicle 10. Alternatively, the display panel 14 can be a touchscreen on a smartphone 27 carried by an occupant of the motor vehicle 10, which is located in the motor vehicle 10 and coupled to the control unit 12 in the motor vehicle 10, for example, using a Bluetooth connection between the smartphone 27 and the communication interface 16 in the motor vehicle 10. Alternatively, the panel in the motor vehicle 10 is not touch sensitive, and instead is coupled to an operating device, such that functions displayed on the panel that can be activated by means of the operating device, which comprises a rotating nob or a button, can be selected. The motor vehicle 10 also has a navigation system, with which the motor vehicle 10 is driven on the street 11 along a predefined route.

In the first step S1 it is checked whether an ordering function 17 has been activated in the motor vehicle 10. A corresponding ordering function symbol that can be selected is displayed on the display panel 14 in the motor vehicle for this. The ordering function 17 can be manually activated by the occupant of the motor vehicle 10. Alternatively or additionally, an ordering probability for the occupant of the motor vehicle 10 may also be determined using an ordering preference criteria. If the determined ordering probability is greater than a predetermined limit probability, the ordering function 17 can be activated in the motor vehicle 10. The ordering preference criteria can comprise typical dining times or typical ordering times for the occupant of the vehicle 10, such that at noon, or some other typical dining time for the occupant, there is a high probability that the occupant will place an order, and the ordering function 17 is then automatically displayed for activation in the motor vehicle 10, which can then be activated through the display panel 14, i.e. through tapping on the corresponding ordering function symbols on the touchscreen. The ordering function 17 can therefore be automatically presented for activation, i.e. without first having to actively select and activate the ordering function 17 in a menu function on the display panel 14.

Alternatively or additionally, the ordering function 17 can be activated directly, and/or presented for activation, as soon as it has been determined that a predefined driving action has been executed by the motor vehicle 10. With a semiautonomous motor vehicle 10, manually controlled by the occupant, and who only receives driving directions regarding the route from the navigation system, the ordering function 17 can be automatically activated if a stored predefined driving action is known, as soon as the predefined driving action takes place. The activation of the ordering function 17 can be linked to deviating from the route 22a, 22b proposed by the navigation system, such that this driving maneuver is interpreted as though the occupant of the motor vehicle 10 had manually activated the ordering function 17.

In another step S2, the current position 18 and a destination 20 of the motor vehicle 10 are determined. The destination 20 is the residence of the occupant of the vehicle 10. The current position 18 is a point on the street 11 where the motor vehicle 10 is currently located. At least one route 22a, 22b from the determined current position 18 to the determined destination 20 is then determined based on route optimization criteria. In this case, two possible routes 22a, 22b are determined, each of which leads to the destination 20. These differ in certain details, potentially with respect to the arrival time at the destination 20 and the total driving distance. Routes 22a, 22b that result in a disproportionately large increase in the driving distance and/or driving time are not proposed. Corresponding guidelines are either stored in the standard manner or provided by the occupant, using the route optimization criteria in the motor vehicle 10. The determination of at least one route 22a, 22b takes place in step S3.

If the ordering function 17 is activated, provider information 25a, 25 for potential providers 24a, 24 is obtained in step S4. These potential providers 24a, 24 offer delivery of an order 28a, 28b by means of a mobile delivery system 26 in a predefined area 29a, 29b along the at least one determined route 22a, 22b. The one potential provider 24a is an Italian restaurant, and the other potential provider 24b is a fast food restaurant. The one potential provider 24a, the Italian restaurant, can deliver an order 28a for a pizza. This pizza order 28a can be delivered by the provider 24a using, for example, a bicycle courier. This bicycle courier has a mobile end device in the form of a smartphone 27, by means of which the delivery of the order 28a can be organized in detail. Analogously to the Italian restaurant that is the potential provider 24a, the fast-food restaurant potential provider 28b can offer delivery of a fast-food meal order 28b by means of the mobile delivery system 26 for the fast-food restaurant in a predefined area 29a for the fast-food restaurant. The predefined area 29a, 29b comprises a delivery radius for the respective potential provider 24a, 24 in which it is willing to deliver the order 28a, 28b by means of the mobile delivery system 26. The predefined area 29a in which the potential provider 24a, the Italian restaurant, is willing to deliver the order 28a is located on the route 22a, while the predefined area 29b for the potential provider 24b, the fast-food restaurant, in which the fast-food restaurant is willing to deliver the order 28b is on the second route 22b.

In the next step S5, a meeting of the motor vehicle 10 with the mobile delivery system 26 for delivery of the order 28a, 28b from the mobile delivery system 26 to the motor vehicle 10 is determined for each of the potential provider 24a, 24b from which provider information 25a, 25b has been obtained. For this, both the coordinates 30a, 30b and a time 31a, 31 for the meeting are determined. The coordinates 30a for the meeting with regard to the potential provider 24a indicate a parking area 50 along the route 22a. The time 31a is a time 31a eight minutes in the future. The coordinates 30b for delivery of an order 28b from the potential provider 24b are also determined, which indicate a parking lot 52 along the second route 22b. The time 31b is 15 minutes in the future. The coordinates 30a, 30b and the times 31a, 31b are determined using traffic condition criteria describing the current traffic conditions and planning criteria. The times 31a, 31b are determined such that the occupant of the vehicle 10 will only have to wait at most for a very short time, typically less than five minutes, at the determined coordinates 30a, 30b, if the meeting is booked for the corresponding time 31a, 31b. Using these criteria, difficult traffic conditions on the corresponding routes 22a, 22b can likewise be taken into account, as well as the time required for delivery from the respective potential provider 24a, 24b.

In the next step S6, the obtained provider information 25a, 25b, comprising, for example, the names of the potential providers 24a, 24b and details relating to the respective orders 28a, 28b, together with the coordinates 38a, 30b and times 31a, 31b determined for the meeting with each of the potential providers 24a, 24b, is determined from the respective provider information 25a, 25b and displayed on the display panel 14 in the motor vehicle 10. The type of restaurant, i.e. the type of food offered by the potential provider 24a, 24b is indicated with a symbol. A slice of pizza may be displayed for the pizzeria, and a portion of French fries may be shown for the fast-food restaurant. In addition, the determined times 31a, 31b for the meeting, details regarding the orders 28a, 28b from the respective providers 24a, 24b in the form of provider information 25a, 25b, and information regarding the coordinates 30a, 30b for the meeting are shown on the display panel 14.

In a next step S7, an ordering option 32a, 32b for placing the delivery order 38a, 38b with a potential provider 24a, 24b can be activated. A button can be shown for this on the touchscreen display panel 14. As soon as the ordering option 32a, 32b is activated, a binding order for delivery of the order 28a, 28b can be sent to the corresponding provider 24a, 24b. Alternatively, it may be provided that as soon as the ordering option 32a, 32b has been activated, a order confirmation option 42a, 42b is displayed, and the binding placement of the delivery order 28a, 28b is first sent to the provider 24a, 24b after this order confirmation option 42a, 42b has been activated. There can also be an additional query, asking if the occupant actually wants the order 32a, 32b to be placed.

In the context of providing the ordering options 32a, 32b that can be activated, it may be the case that, if provider information 25a, 25b is obtained from numerous potential providers 24a, 24b, as is the case here, a respective ordering probability is first determined for each potential provider 24a, 24b using ordering behavior criteria applied to the obtained provider information 25a, 25b. The ordering probability estimates the probability that the occupant of the motor vehicle 10 will order from the respective determined potential providers 24a, 24b of the order 28a, 28b. The determined ordering probability is evaluated for activating the ordering options 32a, 32b for the orders 28a, 28b. The ordering behavior criteria can comprise previous orders from the occupant, i.e. an order history, and/or preferences that have been set. At least one of the following guidelines can be stored therefore, using the ordering behavior criteria: a maximum time for delivery of the order 28a, 28b, a maximum price for the order 28a, 28b, a maximum delay for arriving at the destination 20 by activating the coordinates 30a, 30b determined for the meeting, a minimum average customer rating for the potential providers 24a, 24b, and/or ordering behavior data for the occupant that have been stored. The ordering behavior data can be stored, for example, in an occupant profile 37. When a corresponding occupant profile 37 is selected on the touchscreen panel, it can be manually activated and/or modified by the occupant of the vehicle 10. The occupant profile 37 can also, or alternatively, be configured on an occupant's mobile end device, a computer, and/or tablet, and/or stored in the external processor 33. The stored ordering behavior data can comprise the order history, information regarding food allergies, favorite dishes and beverages of the occupant, and/or information regarding typical mealtimes for the occupant. The ordering behavior criteria per se, and an ordering preference criteria for the occupant, can also be stored in the occupant profile 37. The ordering preference criteria has already been described above in the context of the automatic provision of the ordering function 17 for activation in the motor vehicle 10. The occupant profile 37 can be uploaded from the external processor 33 via the communication connection 19, such that both the ordering options 32a, 32b, as well as potentially the ordering function 17, are evaluated with the data stored there, and can be taken into account internally in the motor vehicle 10. It may also be possible to store the occupant profile 37 in the control unit 12 in the motor vehicle 10.

In a next step S8, if the ordering option 32a, 32b from one of the potential providers 24a, 24b is activated by the occupant, the motor vehicle 10 is at least semiautonomously driven to the determined meeting with the mobile delivery system 26 for delivery of the order 28a, 28b from this potential provider 24a, 24. The motor vehicle 10, which is currently fully autonomously driven by the control unit 12 is therefore fully autonomously driven to the determined meeting with the mobile delivery system 26, without the occupant of the motor vehicle 10 having to do anything else. If the occupant decides to order a pizza 28a from the potential provider 24a, i.e. the Italian restaurant, the motor vehicle 10 is automatically steered to the first route 22a, such that it will arrive at the determined time 31a at the determined coordinates 30a in the parking area 50.

After the ordering option 32a has been activated, order information 34 that describes the placement of the delivery order 38a, i.e. the delivery of the pizza 28a, as well as the determined coordinates 30a and the determined time 31a for the meeting of the motor vehicle 10 with the mobile delivery system 26, is sent to the external processor 33. After this step, a delivery route 35 and a delivery time 36 for the mobile delivery system 26 for the determined meeting is determined in step S10 using delivery planning criteria. This determination can take place in the external processor 33 that can be in the form of a server. In a subsequent step S11, the determined delivery route 35 and the determined delivery time 36 are sent to the mobile delivery system 26. The determined delivery route 35 and the determined delivery time 36 are sent as respective data to the bicycle courier's smartphone 27, who then delivers the pizza 28a to the determined meeting using his bicycle, i.e. by means of the mobile delivery system 26. The corresponding data transfer takes place via the external processor 33, which establishes a corresponding communication connection 19 with a communication interface 16 on the bicycle courier's smartphone 27, at least for the data transfer.

This accordingly makes it possible to deliver the order 28a, i.e. the pizza, from the mobile delivery system 26 to the motor vehicle 10 at the determined time 31a, corresponding to the delivery time 36, at the determined coordinates 30a in the parking area 50. To ensure that this delivery and transfer can actually take place, a query signal 38 is sent to the potential provider 24a, 24 for which the provider information 25a, 25b has been obtained, by means of which it is asked whether the delivery of the order 28a, 28b to the determined coordinates 30a, 30b and at the determined time 31a, 31b for the meeting is offered by the at least one potential provider 24a, 24b. The ordering option 32a, 32b for this provider 24a, 24b can only be activated if a response signal 39 has been received, according to which the query transmitted in the form of a query signal 38 is confirmed. If the fast food restaurant, for example, the potential provider 24b, responds using the response signal 39, that it is not possible to deliver the fast food meal to the determined coordinates 30b in the parking lot 52 at the determined time 31b because the fast food restaurant is currently too busy, this ordering option 32b is never even displayed, for example, on the display panel 14 in the motor vehicle 10. In this case, the occupant can only place an order 28a from the one potential provider 24a, for example, the Italian restaurant.

The provider information 25a, 25b that is displayed on the display panel 14 also comprises current order time data. The current order time data are continuously generated using the traffic condition criteria describing the current traffic conditions and the planning criteria. Current order time data for the respective potential provider 24a, 24b can be determined each minute, or even more frequently, or less frequently. The order time data indicate the latest possible time 57a, 57b for activating the ordering option 32a, 32b, for delivery of the order 28a, 28b to the determined coordinates 30a, 30b and at the determined time 31a, 31b for the meeting. The time remaining until this latest time 57a, 57b at which the ordering option 32a, 32b is to be activated in order to arrive at the meeting can also be displayed on the display panel 14, in addition o the determined time 31a, 31b. If traffic conditions change, for example, due to an unexpected traffic jam, or preparation of the pizza, i.e. the order 28a, is delayed, the current remaining time until the binding placement of the order can be displayed as the latest time 57a, 57b on the display panel 14. The occupant can then decide whether or not he still wants to place the order 28a, 28b, i.e. the pizza, even if delivery will be delayed, for example, due to a traffic jam on the street 11, because the motor vehicle 10 would first arrive at the determined coordinates 30a in the parking area 50 that was assumed at the start in the first steps S1 to S4. In addition, after a certain amount of time has elapsed between activating the ordering function 17 and the actual activation of the ordering option 32a, 32b, it can be ensured that current information is always available at the time the ordering option 32a, 32b is activated, such that a binding order is not placed that no longer corresponds to the current order time data because of delivery delays from the provider 24a, 24b or delays due to the current traffic conditions. In this case, only the latest time 57a, 57b for activating the ordering option 32a, 32b is shown initially.

It may also be continuously checked through use of realization criteria 40, after the ordering option 32a, 32b has been activated, whether the delivery of the order 28a, 28b can still be achieved at the determined coordinates 30a, 30b and at the determined time 31a, 31b for the meeting. This is illustrated with the motor vehicle 10' in the FIGURE. In the framework of the use of the realization criteria 40, the current traffic conditions and the current planning by the provider 24a, 24b, i.e. the traffic condition and planning criteria, are taken into account. If it has been determined that the delivery of the order 28a, 28b to the determined coordinates 30a, 30b and at the determined time 31a, 31b for the meeting can no longer be achieved, alternate coordinates 30c and/or an alternative time 31c for an alternative meeting are determined, and the motor vehicle 10' is at least semiautonomously driven to the alternative meeting. An alternative meeting, for example, due to delivery delays for the pizza, i.e. the order 28a, can be determined in the form of alternative coordinates 30c in a parking space 54, which is also located on the route 22a to the destination 20. Such a meeting no longer takes place eight minutes in the future, as originally determined, but first 20 minutes in the future. As a result, the delivery of the order 28a, 28b to the occupant of the motor vehicle 10' is delayed, but the desired order 28a, 28b, i.e. the pizza from the Italian restaurant, will still be delivered without an additional detour, i.e. deviating from the selected route 22a. The alternative time 31c is preferably the same as the previously determined time 31a, 31b, such that only the coordinates 33a, 33b, 33c for the meeting differ. A transfer location and transfer time for the food delivery is therefore generated dynamically, and also dynamically adjusted to the current conditions. After the Italian restaurant is selected as the provider 24a, and the order 28a, i.e. the pizza, has been selected. The determined coordinates 30a for the parking area 50 are first dynamically determined as the delivery location, and then, due to a change in traffic conditions or delivery conditions, or a change in the delivery conditions at the Italian restaurant, the alternative delivery location is determined in the form of the alternative coordinates 30c for the parking space 54, and automatically driven to. The corresponding alternative coordinates 30c and the alternative time 31c are sent to the mobile delivery system 26 as an alternative delivery route 35 and therefore an alternative delivery time 36, such that the actual delivery can still take place without difficulty.

On the whole, the example represents a convenient means for placing an order with a service provider in conjunction with route navigation. It is also relevant that, prior to activating the order confirmation option 42a, 42b, or prior to activating the ordering option 32a, 32b, the order may not yet be placed, and thus the previous procedure is aborted in a non-binding manner, and/or it is possible to navigate back to a display of the determined provider information 25a, 25 and the determined coordinates 30a, 30b and the determined times 31a, 31b for the meeting, on the display panel 14 in the motor vehicle 10.

If a food order from the occupant has already been placed before starting travel, or during travel in an (autonomous) motor vehicle 10, the food order should then be able to be transferred from a service provider to a location that can be dynamically changed, to or through which the occupant would drive. This is of particular interest in scenarios with autonomous driving. The service provider is also able to dynamically alter the transfer location depending on the situation (including, but not restricted to, traffic conditions). With future fully autonomous motor vehicles, scenarios in which the vehicle occupants are relaxing, or even sleeping in the cab, shall become more frequent. This also includes scenarios in which travelers are brought over night from an initial location, i.e. the current location 18, to a target location, i.e. the destination 20, with a fully autonomous motor vehicle 10. In this context, it may be the case that the occupant wakes up in the motor vehicle 10 in the nighttime, and wants to order food and/or beverages, but does not want to get out of the motor vehicle 10. The occupant can store restrictions with regard to the ordering procedure in advance, in order to simplify the procedure, which may include:
- a maximum time until transfer of the food, or the fastest possible delivery;
- a maximum price for the meal;
- a maximum delay potentially caused by a change in the route 22a, 22b;
- a minimum positive rating from other customers in an online rating tool for the delivery service 24a, 24b (or even for a specific dish or meal);
- a prioritization for specific dishes, or storing of preferences for the food and/or beverage (allergies, bans on certain foods).

The customer, i.e. the occupant, can be shown possible service providers, i.e. the potential providers 24a, 24b along the route 22a, 22b, with background information, such as that listed above, i.e. with provider information 25a, 25b. Recent orders, potentially with personal ratings of the possible potential provider 24a, 24b, are also shown initially. Prioritizations can also be specified by the occupant for the above points, such that the list of suggestions of potential providers 24a, 24b is prioritized accordingly. If an occupant initiates an order via the display panel 14 coupled to the vehicle's navigation system, an intermediate destination can be dynamically generated, based on the availability for a potential provider 24a, 24b and the actual route 22a, 22b, such that the order 28a, 28b, i.e. the meal, can be delivered to the occupant at an intermediate stop. The delivery of the meal takes place at a location that can be altered dynamically, which can adjusted dynamically in accordance with the traffic conditions for the occupant and the delivery system 26. The transfer of the corresponding service or product, i.e. the order 28a, 28b, therefore may take place at a parking lot 52 on a highway, and can potentially also be delivered with a drone or a combination comprising a delivery vehicle (potentially also autonomous) and a drone. The potentially autonomous motor vehicle 10 of the occupant may also be driven fully autonomously (in accordance with a dynamic adjustment to the transfer location) to a rest area on the highway, exiting the highway, and waits there for the delivery of the order 28a, 28b, i.e. the freshly prepared meal.

The two parties (the occupant and provider 24a, 24 in the form of a mobile delivery system 26) can meet at a common location, this being the coordinates 30a, 3b determined for the meeting. The ordering of a meal could also refer in general to other services or products that have been ordered. Another example may be configured were, if only the address for a restaurant is given as the destination 20 by the navigation system in a motor vehicle 10, or if a branch of a restaurant chain lies within a certain radius of the destination, or if a branch of a restaurant chain is specifically searched for and then driven to, a simple and convenient ordering can be initiated from the motor vehicle 10. If the occupant wants to place an order, suggestions of orders he has typically made from a branch of the restaurant chain in the past are presented, from which he can make a selection. The prioritization of the list of previous orders can then potentially be preset: an order that has been frequently placed for a specific item 28a, 28b will be placed higher in the list. The list can also correspond to a history that typically comprises the last five orders, from which the occupant can chose and place an order from the motor vehicle 10. This listing is then comparable to a destination search in the navigation system, with the search term "last destination," but instead with a list of "last orders" and/or "last orders from restaurant X." An order can be placed by means of a selection that can be activated, i.e. the ordering option 32a, 32b. The presorting with the previous orders can also be connected with a person identification in the vehicle cab: in this manner, it is detected who the driver or initiator of the order is, and it is even possible to present a selection for each person in the motor vehicle corresponding to the detected number of people, and potentially with respective person identifications, even corresponding to the respective "last orders." The respective individual orders can naturally be modified if desired, i.e. by selecting a different beverage, etc.

It is also advantageous if the provider 24a, 24b is also informed with the placement of an order for food when the destination 20 is expected to be reached, such that the meal can be freshly prepared. Alternatively, the order is first to be sent out when the occupant has reached a specific distance to the provider, or the anticipated driving time falls below a predefined limit. It may also be the case that an adjusted anticipated arrival time is continuously dynamically transmitted at predetermined time intervals. The suggested menus under the "last orders" in the ordering procedure can also depend on the time of day, the weekday, or the season. As a result, breakfast menus can be suggested in the morning, and suggestions for cake and coffee and/or snacks can be proposed in the afternoon.

A meal can also be ordered dynamically, as a function of driving actions, or a possible order can be queried dynamically if an intermediate destination has been generated dynamically. The following scenario can be implemented accordingly: the driver causes the motor vehicle to exit the route 22a, 22b on the highway via an exit. He has already stored the information in the navigation system that he wants to order food after this driving action (leaving the highway at an exit, making a detour from the route 22a, 22b proposed by the navigation system), which is then to be generated automatically, or upon request, as a new intermediate destination, such that the navigation system does not constantly try to steer the motor vehicle 10 back to the highway. It may then be checked whether there is a potential provider 24a, 24b in the area. A specific radius can be predefined for the search, for example, a maximum of ten kilometers, and/or a maximum of ten minutes driving time. If the navigation system finds a potential provider 24a, 24b, the vehicle is driven there—potentially in accordance with a confirmation following a query. A query for an order can be associated therewith in advance (prior to arriving at the provider 24a, 24), as described above. It makes sense in general for vehicle occupants to be able to initiate orders early while underway, whereas the placement of the order with the provider 24a, 24b, and potentially the payment, first then takes place when the arrival time is known more precisely, i.e. the determined time 31a, 31b is established with a higher realization probability, or is less than ten minutes in the future, in order to avoid problems arising when the route changes due to traffic, such that another provider 24a, 24b has to be used. The initiation of the order, and the potentially associated payment can also be queried again. The food can also be delivered by the mobile delivery system 26 to the determined coordinates 30a, 30b, or the destination 20 while the occupant is still underway to the coordinates 30a, 30b or the destination 20. The anticipated arrival time is dynamically transmitted to the service provider, such that the meal can be delivered on time. Delays caused by traffic are therefore automatically taken into account. The occupant can activate a selection option, "order meal at destination" after entering the destination 20 in the navigation system, and then potentially have the last orders at this location, serving as the destination 20, listed, and then potentially first have a list of providers 24a, 24b of previous orders displayed, and then select a provider 24a, 24b from the list, and then proceed as explained above, i.e. by making a selection from a list of previous orders from this provider 24a, 24b.

There is, of course, always the possibility that the occupant searches for new potential providers 24a, 24b that can deliver on time to the vehicle 10 in the vicinity of the route 22a, 22b. If no provider 24a, 24b has been ordered from in the past, new providers 24a, 24b can be searched for that have delivered to the occupant in the past along another route 22a, 22b within a respective specified radius, who can also deliver on time to a location on the current route 22a, 22b. If no potential provider 24a, 24b is found, a compilation of possible potential providers 24a, 24b can be listed, potentially with known preferences of the occupant, who can deliver on time to a location on the current route 22a, 22b. When an order is initiated from a motor vehicle 10 with a fixed destination 20, the occupant can also specify that the delivery first take place at the arrival time, or first after an associated delay, or at a predefined time.

LIST OF REFERENCE SYMBOLS 10 motor vehicle
11 street
12 control unit
14 display panel
16 communication interface
17 ordering function
18 current position
19 communication connection
20 destination
22a, b route
24a, b provider
25a, b provider information
26 mobile delivery system
27 smartphone
28a, b order (item)
29a, b area
30a, b determined coordinates
30c alternative coordinates
31a, b determined time
31c alternative time
32a, b ordering option
33 external processor
34 order data
35 delivery route
36 delivery time
37 occupant profile
38 query signal
39 response signal
40 realization criteria
42a, b order confirmation option
50 parking area
52 parking lot
54 parking space
57a, b latest possible time

The invention claimed is:
1. A process for operating an at least semiautonomous motor vehicle, comprising:
  determining an ordering function has been activated in the motor vehicle;
  establishing a current position and destination of the motor vehicle;
  determining at least one optimized route from the established current position to the established destination;
  obtaining provider information, via an ordering function, from potential providers that offer delivery of the order via a mobile delivery system to a predefined area on the at least one determined route;
  for each of the potential providers:
    determining coordinates and a time for an intersection of the motor vehicle with the mobile delivery system using current traffic condition criteria comprising current traffic conditions, and planning criteria, and
    displaying the obtained provider information and the determined coordinates and the determined time for the meeting on a display panel in the motor vehicle;
  activating an ordering option to place a delivery order with a potential provider; and
  activating an at least semiautonomous guidance of the motor vehicle to the intersection with the mobile delivery system.

2. The process according to claim 1, further comprising:
after activating the ordering option, transmitting (i) ordering data describing the delivery order for the order, and (ii) the determined coordinates and determined time for the intersecting of the motor vehicle with the mobile delivery system, to an external processor, for determining a delivery route and a delivery time for the mobile delivery system for the determined intersecting using delivery planning criteria, and transmitting the determined delivery route and the determined delivery time to the mobile delivery system.

3. The process according to claim 1, further comprising:
if provider information is obtained from a plurality of potential providers, determining a respective ordering probability using order behavior criteria on the obtained provider information, estimating the probability of an order being successfully fulfilled with the determined potential providers.

4. The process according to claim 3, wherein the ordering behavior criteria comprises at least one of:
a maximum time for the delivery of the order;
a maximum price for the order;
a maximum delay in arriving at the destination by driving to the determined coordinates for the meeting;
a minimum average customer rating for the potential providers; and/or
stored ordering behavior data for the occupant.

5. The process according to claim 3, wherein the ordering probability is determined using ordering preference criteria, and, if the determined ordering probability is greater than a predefined minimum limit probability, the ordering function is provided for activation in the motor vehicle.

6. The process according to claim 3, further comprising storing the ordering behavior criteria in an occupant profile linked to the occupant of the motor vehicle, which provides the ordering option.

7. The process according to claim 1, further comprising determining that a predefined driving action has been executed by the motor vehicle, and activating the ordering option in response thereto.

8. The process according to claim 1, wherein activating the ordering option comprises:
transmitting a query signal to the at least one potential provider to determine whether the at least one potential provider is able to deliver the order to the determined coordinates and at the determined time for the intersection, and
receiving a response signal confirming the query signal; and
activating the ordering option in response thereto.

9. The process according to claim 1, wherein the provider information comprises current order time data, continuously generated using the traffic condition and planning criteria, and indicating the latest possible time for activating the ordering option in order to place the order such that it can be delivered to the determined coordinates and at the determined time for the intersection.

10. The process according to claim 1, wherein after the ordering option is activated, the ordering option is continuously checked using realization criteria whether the delivery of the order to the determined coordinates and at the determined time for the intersection can still be achieved, and wherein, if it has been determined that the delivery of the order to the determined coordinates and at the determined time for the meeting cannot be achieved, generating alternative coordinates and/or an alternative time for an alternative meeting using the traffic condition and planning criteria.

11. The process according to claim 1, further comprising generating a binding order for the delivery of the order after the ordering option is activated.

12. The process according to claim 11, further comprising displaying an order confirmation option in the motor vehicle after the ordering option has been activated, and transmitting the binding order for delivery to a corresponding provider.

13. A system for an at least semiautonomous motor vehicle, comprising:
a memory; and
a control unit, coupled to the memory, wherein the control unit and memory are configured to
determine an ordering function has been activated in the motor vehicle;
establish a current position and destination of the motor vehicle;
determine at least one optimized route from the established current position to the established destination;
obtain provider information, via an ordering function, from potential providers that offer delivery of the order via a mobile delivery system to a predefined area on the at least one determined route;
for each of the potential providers:
determine coordinates and a time for an intersection of the motor vehicle with the mobile delivery system using current traffic condition criteria comprising current traffic conditions, and planning criteria, and
display the obtained provider information and the determined coordinates and the determined time for the meeting on a display panel in the motor vehicle;
activate an ordering option to place a delivery order with a potential provider; and
activate an at least semiautonomous guidance of the motor vehicle to the intersection with the mobile delivery system.

14. The system according to claim 13, wherein the control unit and memory are configured to:
after activating the ordering option, transmit (i) ordering data describing the delivery order for the order, and (ii) the determined coordinates and determined time for the intersecting of the motor vehicle with the mobile delivery system, to an external processor, for determining a delivery route and a delivery time for the mobile delivery system for the determined intersecting using delivery planning criteria, and transmit the determined delivery route and the determined delivery time to the mobile delivery system.

15. The system according to claim 13, wherein the control unit and memory are configured to:
if provider information is obtained from a plurality of potential providers, determine a respective ordering probability using order behavior criteria on the obtained provider information, estimating the probability of an order being successfully fulfilled with the determined potential providers.

16. The system according to claim 15, wherein the ordering behavior criteria comprises at least one of:
a maximum time for the delivery of the order;
a maximum price for the order;
a maximum delay in arriving at the destination by driving to the determined coordinates for the meeting;

a minimum average customer rating for the potential providers; and/or stored ordering behavior data for the occupant.

17. The system according to claim 15, wherein the ordering probability is determined by the control unit and memory using ordering preference criteria, and, if the determined ordering probability is greater than a predefined minimum limit probability, the ordering function is provided for activation in the motor vehicle.

18. The system according to claim 13, wherein the control unit and memory are configured to determine that a predefined driving action has been executed by the motor vehicle, and activating the ordering option in response thereto.

19. The system according to claim 13, wherein the control unit and memory are configured to activate the ordering option by:

transmitting a query signal to the at least one potential provider to determine whether the at least one potential provider is able to deliver the order to the determined coordinates and at the determined time for the intersection, and receiving a response signal confirming the query signal; and activating the ordering option in response thereto.

20. The system according to claim 13, wherein the provider information comprises current order time data, continuously generated using the traffic condition and planning criteria, and indicating the latest possible time for activating the ordering option in order to place the order such that it can be delivered to the determined coordinates and at the determined time for the intersection.

21. The system according to claim 13, wherein after the ordering option is activated, the control unit and memory are configured to continuously check the ordering option using realization criteria whether the delivery of the order to the determined coordinates and at the determined time for the intersection can still be achieved, and wherein, if it has been determined that the delivery of the order to the determined coordinates and at the determined time for the meeting cannot be achieved, generate alternative coordinates and/or an alternative time for an alternative meeting using the traffic condition and planning criteria.

* * * * *